United States Patent [19]

Troletti

[11] Patent Number: 4,743,982

[45] Date of Patent: May 10, 1988

[54] DIGITAL DATA SEPARATOR

[75] Inventor: Bonifacio Troletti, Darfo-Boario Terme, Italy

[73] Assignee: Honeywell Information Systems Italia, Italy

[21] Appl. No.: 910,706

[22] Filed: Sep. 23, 1986

[30] Foreign Application Priority Data

Oct. 10, 1985 [IT] Italy .................................. 22430 A/85

[51] Int. Cl.$^4$ .............................................. G11B 5/09
[52] U.S. Cl. .................................................... 360/45
[58] Field of Search ...................... 360/45, 51; 375/101

[56] References Cited

U.S. PATENT DOCUMENTS 4,672,482  6/1987  Troletti .................................. 360/45

Primary Examiner—Vincent P. Canney

Attorney, Agent, or Firm—Faith F. Driscoll; John S. Solakian

[57] ABSTRACT

A digital data separator for use with apparatus for recovering binary information recorded on a movable media in frequency modulation (FM) or modified frequency modulation (MFM) comprises a measurement unit which for each read pulse received as an input provides a code representing the actual duration of an interval N between read pulse n and the preceding read pulse n−1 and a speed error correction unit which corrects an actual interval duration relative to the speed error of the movable media. The separator further includes a peak-shift recovery unit which provides as an output, nominal duration information related to interval N based on the corrected interval duration and on the peak-shift of pulse n−1, determined by taking into account the corrected duration of an interval N−1, a preceding interval N, and the nominal duration of intervals N−1 and N−2 preceding interval N.

3 Claims, 4 Drawing Sheets

DIGITAL DATA SEPARATOR

RELATED PATENT APPLICATIONS

1. The patent application of Bonifacio Troletti entitled, "Digital Data Separator", filed on Sept. 23, 1986, bearing Ser. No. 06/911,022, which is assigned to the same assignee as this patent application.

2. The patent application of Bonifacio Troletti entitled, "Digital Apparatus for Data Recovery System, which issued as U.S. Pat. No. 4,714,968 on Dec. 22, 1987 and which is assigned to the same assignee as this patent application.

3. The patent application of Bonifacio Troletti entitled, "Digital Apparatus for Magnetic Media Data Recovery System", which issued as U.S. Pat. No. 4,672,482 on June 9, 1987 and, which is assigned to the same assignee as this patent application.

BACKGROUND OF THE INVENTION

1. Field of Use

The present invention relates to a digital data separator for apparatus used to recover binary information recorded on magnetic media, such as disks, diskettes, tapes, in frequency modulation (FM) or modified frequency modulation (MFM).

2. Prior Art

Successively read out binary 1 or 0 bits recorded in FM are identified by the presence or absence, respectively, of a pulse in the center of contiguous recorded cells. Each cell is defined by two timing pulses. The first pulse defines the beginning of the cell and the second pulse defines the beginning of the subsequent cell.

The time interval of a cell varies according to the media used. For instance, in the case of an 8-inch diskette and FM recording, the cell has a nominal length of 4 microseconds. Therefore, the nominal time intervals between two subsequent pulses may be 2 microseconds or 4 microseconds. In the case of a 5¼ inch diskette, the nominal length of a cell is generally 8 microseconds.

In the case of MFM recording, successively read out binary 1 or 0 bits are also identified by the presence or absence respectively of a pulse in the center of contiguous cells. However, MFM recording differs from FM recording in that the timing pulse, defining the beginning of a cell, is absent when a pulse representative of a binary 1 information is present in the center of such cell or in the preceding one.

Also, for MFM, the time interval of the cell depends on the recording media. For instance, in case of an 8-inch diskette and MFM recording, the nominal length of the cell is 2 microseconds. Therefore, the nominal interval time between two subsequent pulses can be 2, 3 or 4 microseconds. In the case of a 5¼ inch diskette, the nominal length of a cell is generally 4 microseconds. Futher information on FM or MFM recording methods can be found in the IBM document GA 21-9257-1 entitled, "IBM Two side diskette Original Equipment Manufacturers Information—Second Edition", dated November, 1977.

The pulse sequence read out from the magnetic media support is applied to an input of a recovery system which supplies to an output, the binary information related to the input pulse sequence. Such pulse sequence periodically includes a so-called synchronization field (generally of 6 or 12 bytes), containing a predetermined number of pulses corresponding to a plurality of contiguous cells in which all "1" information bits or all "0" information bits have been recorded. The synchronization field is used by the recovery system for locking in and for establishing if a pulse detected in the input is a timing pulse or a pulse representative of a recorded information bit. The recovery system is therefore able to correctly detect information recorded on the magnetic medium on the basis of the time interval between two subsequent pulses and the nature of such pulses.

Unfortunately, data recovery only through measurement of the time interval between subsequent pulses is not reliable, since such interval may present a substantial deviation from its nominal value resulting in the misinterpretation of the pulse sequence during the recovery phase. Such deviation results from two main causes. The first is due to speed changes in the magnetic media, that is, in the rotational speed tolerances of the motor which drives the magnetic media. The second is due to the so-called phenomenon of peak-shift of the recorded pulse. As it is well known in the art, such shift is primarily due to the mutual influence of adjacent pulses. As known, such shift can be considered zero only when the recorded pulses density is constant, that is, the interval between subsequent pulses is always equal.

Clearly, this situation does not exist in FM and MFM recording, except for the synchronization field. Therefore, the recovery system needs apparatus to correct for the causes of such errors. The most well known of these apparatuses are those which make use of an analog phase lock oscillator. Digital phase lock circuits have been recently suggested.

Among the phase lock circuits, the apparatus disclosed in European patent application No. 84107390.1 of June 22, 1984, published on May 15, 1985 with No. 0141028 can be considered as exemplary of the state of the art. This patent application corresponds to U.S. patent application entitled, "Digital Apparatus for Magnetic Data Recovery System", Ser. No. 06/659,112, filed on Oct. 9, 1984. According to such patent application, the problem of recovering digital information recorded on magnetic media is solved by providing circuits able to identify, through the measurement of the actual interval between subsequent pulses, the synchronization field which is not affected by peak-shift but only by a possible speed error, and therefore is able to establish the speed error of the magnetic media as to a nominal speed during a time interval which comprises a suitable number of read out pulses. This information, updated at each synchronization field detection, is used during the reading out of subsequent read out pulses to correct the interval measured between subsequent read out pulses, thus providing a measured interval only affected by peak-shift error of pulse n and n−1 defining the measured interval.

This information is applied to a peak-shift recovery unit together with coded information feedback by the same recovery unit, defining the entity and the direction of the peak-shift of read pulse n−1. The deduction of the peak-shift of read pulse n−1 from the correct duration measure allows the calculation of the nominal duration of the interval N between read pulse n−1, n and the entity and the direction of the peak-shift of pulse n. The peak-shift of pulse n is fed back to discriminate between the nominal duration of the subsequent interval N+1 and the peak-shift of the subsequent read pulse n+1 and so on.

To avoid the propagation and the accumulation of measurement errors, the peak-shift recovery system supplies in feeds back not the peak-shift measurement obtained by a difference between measures, but an "equivalent" code representative of the nominal and actual durations of a determined number of intervals between immediately preceding read pulses. The approach disclosed by the mentioned patent application is extremely efficacious and provides a high discriminating capability, greater than the one offered by a number of analog circuits and by other digital circuits. Substantially, it follows a correction concept in two phases, a speed correction based on a precise speed meansurement, speed being detected when peak-shift phenomena are missing, and a subsequent peak-shift recovery.

In the embodiment described in the above mentioned patent application, the peak-shift recovery is performed by means of a read only memory ROM or by an EPROM which needs to receive as an input a large number of information bits and therefore requires a capacity of at least 4K bytes. The ROM, by transcoding, performs a set of complex logical operations. The digital data separator, however simple from the circuit standpoint, is therefore difficult to implement and manufacture in form of a single integrated circuit component, because it needs large size semiconductor chips, which must contain, in addition to the circuit logic, a memory of related capacity.

SUMMARY OF THE INVENTION

The above limitation is overcome by the digital data separator which performs peak-shift recovery by the combined use of logical transcoding networks, equivalent to ROMs or EPROMs having a small capacity and arithmetic logic units which are relatively simple and easy to be integrated on a single chip. Substantially, the peak-shift recovery process is divided in logically distinct phases. Phases which may be developed with elementary arithmetical operations are performed by means of arithmetical networks while phase developing operations which are functionally complex, are performed by logical transcoding networks. Further, to have the peak-shift recovery process performed in a limited available time, the process is divided in two phases, one subsequent to the other in time, in a way such that the first timed phase can be performed using information available before the time interval allowed for peak-shift recovery. Thus, the second timed phase can be performed during the whole time interval allowed for peak-shift recovery.

The execution of time cascade operations is therefore made possible even within the time limitations imposed by the reading speed of the currently used media, as well by the foreseable increases in the reading speed in the future. These and other features will appear more clearly from the following description of a preferred embodiment of the invention and from the drawings.

DESCRIPTION OF THE PREFERRED EMBODIMENT

Figure 1:
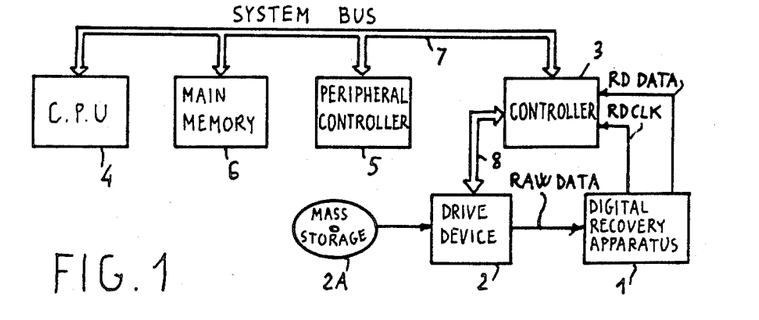
FIG. 1 shows in block diagram form, a conventional data processing system comprising the data recovery system and digital separator of the present invention.

FIG. 1 shows in block diagram form, a typical data processing system which includes the digital apparatus of the present invention. Such apparatus, indicated by reference number 1, is positioned between a drive device 2 for a mass storage 2A and a controller 3. The system of FIG. 1 further comprises a central processor 4, a peripheral controller 5 and a main memory 6. Central processor 4, main memory 6 and controllers 3 and 5 are connected to each other by means of a plurality of leads or system bus 7 through which data, addresses and control signals can be exchanged.

In the present embodiment, it is assumed that the system mass storage is provided with a 5¼ inch diskette and that drive device 2 is a disk drive. The consideration given in the following will be, however, valid for other kinds of storage devices too, as for example, magnetic tape storage.

In the present embodiment, where a mass storage is provided by a diskette, a standard circuit chip, such as the 1791 integrated circuit chip, manufactured by Western Digital Corporation, can be used as controller 3. Controller 3 and drive device 2 exchange a plurality of control and information signals through a channel or bus 8. A detailed description of the circuits and interface signals between controller 3 and device 2 has been omitted since it is not essential for an understanding of the present invention.

In the case of the embodiment of the present invention, with a 5¼ inch diskette used for mass storage together with the 1791 integrated circuit chip manufactured by Western Digital as controller, the circuits and interface signals can be derived from the specification of such products. The same considerations apply to the interface between controller 3 and recovery apparatus 1.

It is pointed out that the recovery apparatus 1 must supply controller 3 with a square wave signal RD CLK and with a pulse train RD DATA at logical level 0, each pulse corresponding to a magnetic flux transition detected on recording media. Pulses RD DATA and window signal RD CLK have only to fulfill the condition that each pulse RD DATA occur entirely within a half wave (or window) of signal RD CLK. As for the rest, the pulse position relative to window signal RD CLK and the pulse length can be arbitrary. However, it is preferred that the length of the pulse RD DATA fall in the range of 100 to 250 nanoseconds and that the delay of the beginning or end of a pulse relative to the transition of window signal RD CLK should be no longer than 40 nanoseconds.

Controller 3 does not need to be informed of whether each one of the pulses RD DATA corresponds to a timing transition or to a data transition. The controller is able to distinguish between such transitions from the pattern read out in response to the well known synchronization and "address mark" fields. Also, the period of the timing or window signal can vary, and each of the two signals half waves may have a different length.

Device 2 supplies digital apparatus 1 with a pulse RAW DATA in response to each detected magnetic flux transition. Since the disclosed system is intended to recover both FM and MFM recorded information, the time intervals between subsequent pulses RAW DATA are indicative of such information. Apparatus 1, in response to the pulse train RAW DATA received as an input, supplies controller 3 with the window signal RD CLK and with the pulses RD DATA which correspond to the pulses RAW DATA suitably positioned relative to window signal RD CLK. By means of signal RD CLK, controller 3 is able to detect the information bits within the pulse train RD DATA and make them available in parallel form to system bus 7.

Figure 2:
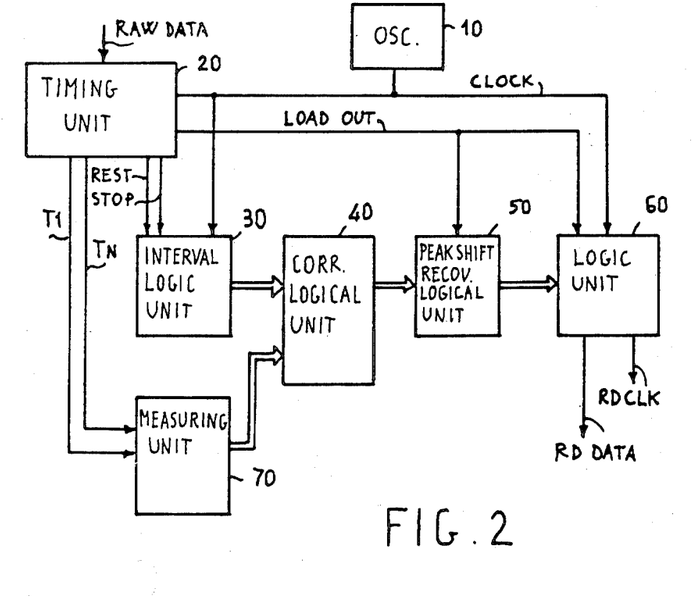
FIG. 2 shows in block diagram form the digital data separator of the present invention.

FIG. 2 shows in block diagram form, the digital apparatus 1 of FIG. 1 which corresponds to the apparatus of the present invention. Apparatus 1 essentially comprises an oscillator 10, a timing unit 20, a logical unit 30 for measuring the interval duration between subsequent input pulses, a logical unit 40 for correcting such duration according to a speed difference relative to a preestablished speed, a logic unit 50 for the peak-shift recovery and discrimination of the nominal duration corresponding to each interval, a logic unit 60 for reconstructing the read pulse train RD DATA within a window signal RD CLK generated by unit 60 itself and a unit 70 for measuring and determining the speed difference relative to a preestablished speed. Oscillator 10 supplies units 20, 30 and 60 with a square wave signal CLOCK having a frequency of 8 MHz.

Timing unit 20 is activated by each of the pulses RAW DATA and supplies a plurality of timing signals REST, STOP, T0, T1, T2, T3 and LOAD OUT to units 30, 50, 60 and 70 in order to control and synchronize their operation. Particularly, signal LOAD OUT is sent to units 50 and 60 and signals REST and STOP are sent to unit 30. Timing unit 20 can be constructed in several ways, such as with shift registers, delay lines and particularly with the same components and connections shown in FIG. 3 of the previously mentioned European patent application. Therefore, any further description is unnecessary.

For ease of understanding the invention, reference is made to FIG. 3 which shows in a timing diagram, the signals generated by oscillatior 10 and by unit 20 together with other signals which will be later considered. The diagram labeled CLOCK is representative of signal CLOCK generated by oscillator 10. The diagram labeled RAW DATA is representative of the read pulses received from unit 20. The read pulses appear as asynchronous events relative to signal CLOCK and at variable time intervals due to the magnetic media speed error and peak-shift.

With the rise of signal CLOCK, immediately subsequent to the rise of signal RAW DATA, signal STOP rises to a "1" and is kept at a "1" for a duration of 19 CLOCK periods. When signal STOP falls to a "0" a signal REST, normally at a "1" falls to a "0" for a duration of one CLOCK period. Signal LOAD OUT rises to logical 1 level for the duration of two CLOCK periods after 16 CLOCK periods from the rise of signal STOP, that is, after 2 microseconds.

The sequence is triggered by pulse RAW DATA and, when the sequence is exhausted, unit 20 remains inactive until a new trigger pulse is received. Measuring unit 30 includes a six cell binary counter, as for example, two 4-bit integrated counters, such as shown in FIG. 4 of the previously mentioned patent application. It is reset by signal REST when at logical 0 level and is incremented on each CLOCK pulse received on a clock input for the entire time signal STOP, applied to a control input, is at logical 0 level. Counter/unit 30 stops when signal STOP is at logical 1 level.

Counter/unit 30 supplies as an output on a channel CNT, a 6-bit binary code CNT÷6 representative of the interval between the rising of two read pulses RAW DATA, expressed in the number of CLOCK periods, less a fixed duration equal to 20 CLOCK periods (that is, 20·125=2500 nanoseconds). The measurement is affected by an uncertainty due to the asynchronous rising of pulses RAW DATA relative to the CLOCk pulses. The maximum value of such uncertainty is equal to two CLOCK periods, that is, ±125 nanoseconds. Counter 30 is therefore able to measure, with a resolution of ±125 nanoseconds, time intervals varying from 2500 nanoseconds to $2500+125\cdot(2^6-1)=10.375$ nanoseconds.

The binary code CNT1÷6 remains unchanged for the entire time signal STOP is at logical 1 level and is applied as an input to both the speed difference recovery unit 40 and the speed error measurement unit 70. Unit 40 further receives through a 5 lead bus ΔV, a binary code 0÷4 representative of the speed error as to the media nominal speed. The memory 40 acts as transcoder and changes the code DNT1÷6 received on channel CNT to a 6-bit code SR 1÷6 representative of an interval duration between read pulses corrected according to code 0÷4, that is, without speed error.

In order to express such duration with a minimum number of bits, the numerical code value may express the interval duration less a constant quantity K, corresponding to the minimum interval duration, say 4 microseconds. Code SR1÷6 is provided as an input to peak-shift recovery unit 50, through channel SR.

As it will be seen in greater detail from the following, unit 50 performs suitable logic operations on code SR1÷6 received as an input and defines which is the nominal duration to be attributed to the interval, whose effective duration, corrected as to speed, is expressed by code SR1÷6. Unit 50 provides as an output, a binary 2-bit code $A_0,B_0$ which indicates if the nominal duration is 4, 6 or 8 microseconds. This code is forwarded to unit 60. Unit 60 is timed by signals CLOCK and LOAD OUT. It provides as an output, a window timing signal RD CLK and a data signal RD DATA as a function of the code $A_0B_0$, periodically received as an input. Signal RD DATA may be interpreted by controller 3 of FIG. 1.

It may be noted that units such as 20, 30, 40, 60 and 70 may be constructed and perform identically to the corresponding units described in the cited European patent application. Thus, any detailed description is not required here and is unnecessary for understanding the invention, the environment of the invention being already adequately described.

Figure 4:
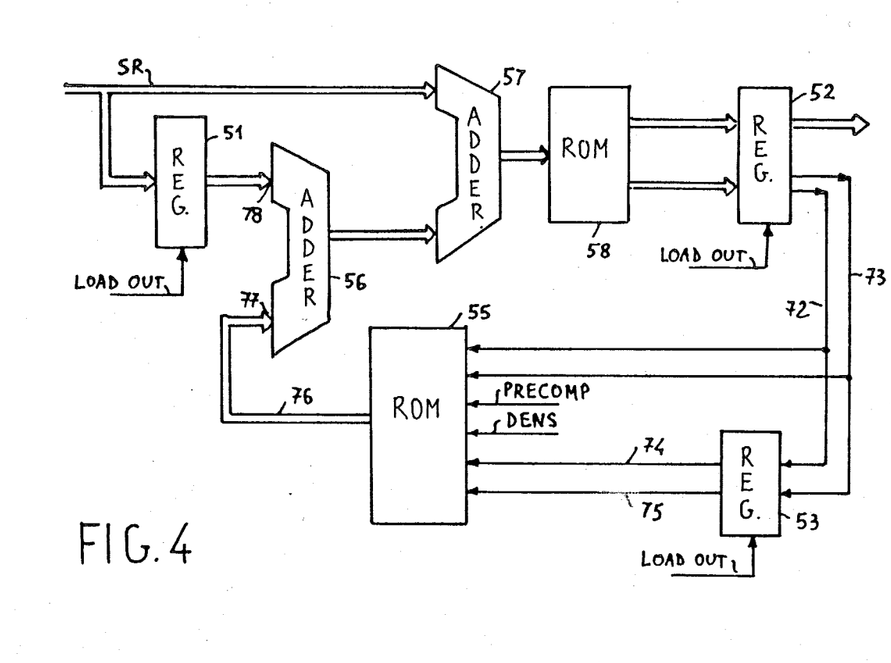
FIG. 4 shows in block diagram form, a preferred embodiment of a peak-shift recovery unit for the digital data separator of the present invention.

Unit 50 may now be considered, where the invention more properly resides, with reference to FIG. 4 which shows in detail, a preferred embodiment. Unit 50 comprises three registers 51, 52 and 53, two ROM transcoding memories 55 and 58 and two adders 56 and 57. Output channel SR of unit 40 is connected to a first input of adder 57 and to the input of register 51. The outputs of adder 57 are connected to the address inputs of ROM 58 whose outputs are connected to the inputs of register 52.

Two outputs of register 52 are connected through leads 72 and 73 to two inputs of ROM 55, as well as to the inputs of two-bit register 53. The outputs of register 53 are connected through leads 74, 75 to two inputs of ROM 55. The outputs of ROM 55 are connected through channel 76 to a first input set 77 of adder 56. Adder 56 has a second input set 78 connected to the outputs of register 51. The outputs of adder 56 are connected to a second input set of adder 57. Registers 51, 52 and 53 are loaded with the information present at their inputs, upon the occurrence of the leading edge of signal LOAD OUT.

Figure 3:
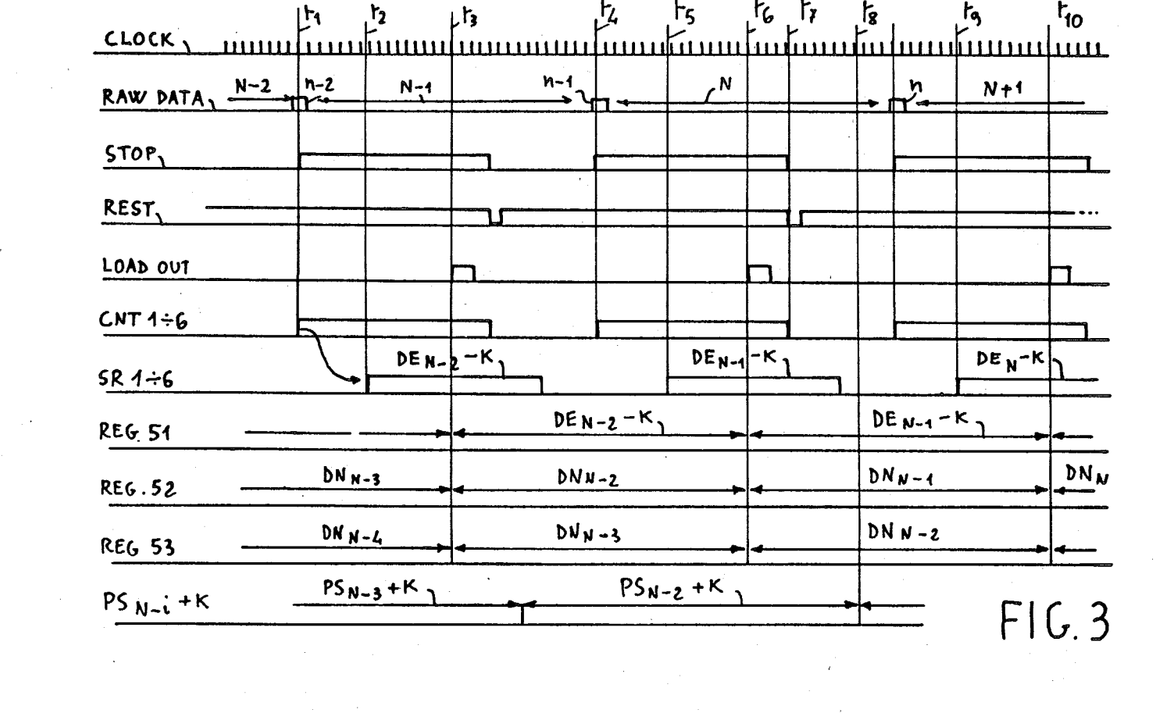
FIG. 3 is a timing diagram showing some signals in the digital data separator of FIG. 2.

The operation of unit 50 may be easily understood with reference to FIG. 3 which shows a timing diagram of the contents of registers 51, 52 and 53. In FIG. 3, the various intervals between subsequent read pulses n−2, n−1, n, and N+1 are numbered in sequential order by N−2, N−1, N, and N+1.

At time $t_1$, with the occurrence of read pulse n−2, a code representative of the actual duration of interval N−2, becomes available at the output of unit 30. This code is corrected as a function of the speed error by unit 40 which provides an output on channel SR and, beginning with time $t_2$, a code representative of the interval N−2 duration, corrected as to speed error and less a constant K corresponding to 4 microseconds. Such code is referenced in FIG. 3 by $DE_{N-2}-K$ and is asserted until time $t_3$. Such code is applied to adder 57 which, at the same time, receives on second input, a code representative of the quantity $PS_{n-3}+K$ where $PS_{n-3}$ is the peak-shift of the pulse which defines the end of interval N−3 and the beginning of interval N−2.

By convention, the peak-shifts which delay the occurrence of the read pulses are considered as positive and the peak-shifts which cause the read pulses to occur earlier are considered negative. Quantity $PS_{n-3}$ may therefore be positive or negative, its absolute value, however, cannot exceed 1 microsecond (if the nominal duration of the intervals is 4, 6, or 8 microseconds). Therefore, quantity $PS_{n-3}+K$ is always positive. With the assumptions made, it is clear that:

$$DE_{N-2}-K=DN_{N-2}-PS_{n-3}+PS_{n-2}-K$$

where $DN_{N-2}$ is the nominal duration of interval N−2.

Therefore, adder 57 provides as an output, a code representative of the quantity $DN_{N-2}+PS_{n-2}$. Such code is applied as an input to ROM 58 which performs as a discriminator/transcoder providing as an output, a two-bit code $A_{N-2}$, $B_{N-2}$ and a code, for instance, a 6-bit code, which represents the quantity $PS_{n-2}$. At time $t_3$, at the leading edge of signal LOAD OUT, the two codes are loaded into register 52 which make them available as an output.

It is clear that beginning at a time $t_5$, a code representative of the quantity $DE_{N-1}-K$ becomes available on channel SR, and that units 57 and 58 perform in the already described so that at time $t_6$, at the leading edge of signal LOAD OUT, register 52 is loaded with a code $A_{N-1}, B_{N-1}$ representative of the nominal duration $DN_{N-1}$ of interval N−1. At the same instant, the previously stored code $A_{N-2}, B_{N-2}$ is loaded into register 53, and quantity $DE_{N-1}-K$ is loaded into register 51.

Therefore, beginning with time $t_6$, ROM 55 receives as an input two codes representative of the nominal durations $DN_{N-1}$ and $DN_{N-2}$. ROM 55 transcodes such codes and provides as an output on channel 76, a binary code representative of the quantity:

$$2K-DN_{N-1}+PS_{n-2}$$

where 2K represents a duration of 8 microseconds, $DN_{N-1}$ is a duration which may take the values 4, 6 and 8 microseconds, $PS_{n-2}$ is a duration which may take values comprised between ±1 microsecond. For the maximum nominal duration $DN_{N-1}=8$ microseconds, the peak-shift of pulse n−2 may obviously be only zero or a delay. Therefore, it can only shorten the effective duration of interval N−1, and with the assumption made that it is positive.

As a consequence, the quantity $2K-DN_{N-1}+PS_{n-2}$ is always positive. This information is available beginning from time $t_7$ and is provided as an input to adder 56 which performs the following operation:

$$(DE_{N-1})+(2K-DN_{N-1}+PS_{n-2})$$

hence, with an obvious substitution:

$$(DN_{N-1}-PS_{n-2}+PS_{n-1}-K)+(2K-DN_{N-1}+PS_{n-2})=PS_{n-1}+K.$$

The binary code $PS_{n-1}+K$ is available as an output from adder 56 at time $t_8$ preceding $t_9$. At time $t_9$ when code $DE_N-K$ becomes available on channel SR, adder 57 performs the following operation:

$$DE_N-K+PS_{n-1}+K$$

hence, with an obvious substitution:

$$(DN_N-PS_{n-1}+PS_n-K)+PS_{n-1}+K=DN_N+PS_n.$$

Thus, adder 57 provides as an output, a code which with an uncertainty expressed as $PS_n$ defines the nominal duration $DN_N$.

Remembering that $DN_N$ may take only the preestablished values 4, 6 and 8 microseconds and $PS_n$ cannot exceed 1 microsecond, in absolute value, it is possible to discriminate in the output code from adder 57, a value $DN_N$ and remainder $PS_n$. This operation is performed by ROM 58 which provides as an output, a binary code $A_0B_0$ expressive of the value $DN_N$ and a code $PS_n$. At time $T_{10}$, corresponding to the leading edge of signal LOAD OUT, $A_0 B_0$ and $PS_n$ are loaded into register 52 and the code $A_0 B_0$ is made available as an input to unit 60. The discrimination process of peak-shift $PS_n$ by means of a sequence of logical operations, instead of a single transcoding operation, as it is the case in the above mentioned patent application, is made possible with the described circuit, for the following two reasons.

From a logical standpoint, the peak-shift of a pulse is mainly due to and the function of the difference between the nominal duration of the intervals immediately preceding and following the pulse. It is therefore theoretically correct to evaluate $PS_{n-2}$ as a function of $DN_{N-2}$ and $DN_{N-1}$ and from that to computer $PS_{n-1}$ from $DE_{N-1}$ by a subtraction operation. The subtraction process always starts from a quantity $PS_{n-2}$ which, for each pulse, is computed as a function of the preceding and following interval duration. Any possible accumulation of measurement error is therefore avoided.

From a timing standpoint, the process divided into a plurality of steps is compatible with the available time intervals because the several steps are time overlapped. In fact, considering time interval $t_6$-$t_{10}$, in case of an elementary cell duration of 4 microseconds and assuming a maximum speed error of ±10%; time interval $t_6$–$t_{10}$ cannot be less than 3–6 microseconds. At time $t_6$, information $DE_{N-1}$, $DN_{N-1}$ and $DN_{N-2}$ is already available in registers 52, 53 and 51. Therefore, units 55 and 56 may start to operate to provide as an output from unit 56, information which is stable and well ahead of time $t_{10}$. In order to have a stable information as an input to register 52 at time $t_{10}$, it suffices that the time $t_9$ at which code SR1÷6, expressing duration $DE_N$ is present as an input to unit 57 precedes $t_{10}$ and the propagation delay in the units 57 and 58 only. This propagation delay may be easily contained within a few hundreds of nanosecond, much less than the 2000 nanosecond interval between reading pulse n and the immediately following LOAD OUT pulse.

As a consequence, the described circuit can be easily embodied in an integrated circuit. In fact, it is clear that unit 55 can be embodied in a ROM (or equivalent logic) having four addressing inputs, with an extremely reduced capacity. By the same token, quantity $DN_N+PS_n$ received as an input by unit 58 may be expressed, with the same resolution of SR1÷6, by a 7-bit code. Unit 58 may therefore be constructed with a ROM (or equivalent decoding logic) having a seven address input with a reduced capacity. Adders 56 and 57, having to perform binary addition on input data which are always positive, may be embodied in very simple and compact integrated circuitry.

The extremely high reduction in circuit complexity permits the addition of further features to the circuit which enhance and broaden its performance. In fact, it becomes feasible to increase the measurement resolution of the interval's actual duration by expressing such duration by a bit number greater than 6, for instance 7 or 8. Likewise, the peak-shift computed by unit 55 as a function of $DN_{N-2}$, $DN_{N-1}$ may be chosen among possible different values, to take into account the effective recording density and the recording modalities. For instance, it is possible to have two further selection inputs for ROM 55 as shown in FIG. 4. One of such inputs, named PRECOMP indicates if the magnetic media has been recorded with write precompensation in order to reduce the peak-shift phenomena when reading. The other of such inputs, named DENS, defines two possible recording density ranges, that is, the number of cells recorded per length unit of the magnetic track.

Figure 5:
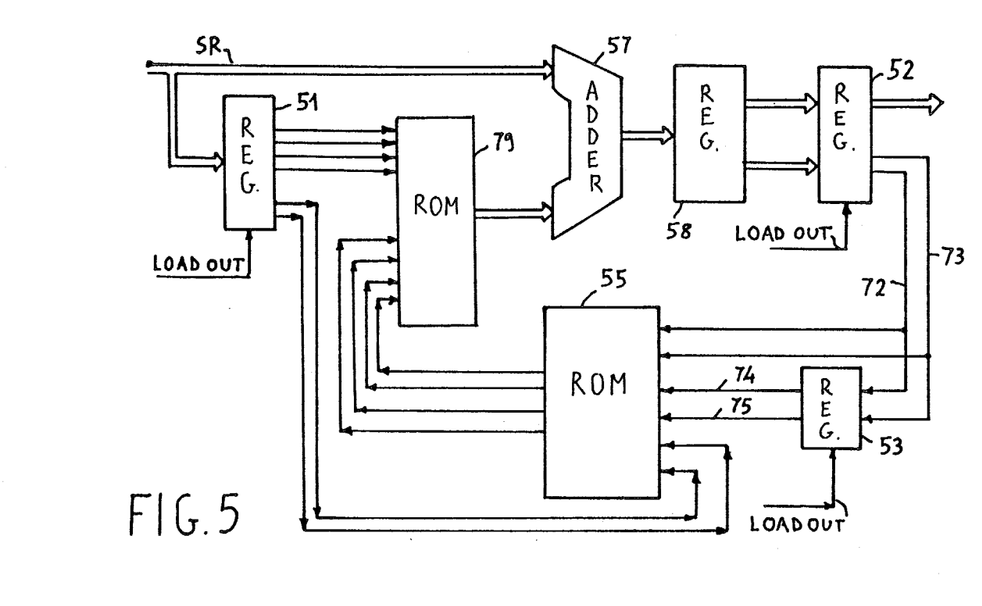
FIG. 5 shows another embodiment of the peak-shift recovery unit of the present invention.

The embodiment shown in FIG. 4 may be further modified by substituting arithmetic unit 56 with a small size ROM performing according to the same algorithm and in that case, adding further suitable corrections. Such embodiment is shown in FIG. 5 and is particularly advantageous if the actual duration of the intervals, corrected as to speed is expressed by a code with a limited number of bits, 5 or 6. This implies a measurement uncertainty, which may be partially recovered.

In FIG. 5, register 51 provides as an output, a code SR1÷5 having six bits and being representative of the actual duration of interval N−1 corrected as to speed. The four least significant bits of the code are provided as an input to a ROM 79. The two most significant bits are provided as an input to ROM 55 which receives on other four inputs, the codes $DN_{N-1}$, $DN_{N-2}$ as an output from registers 52 and 53 respectively. The codes $DN_{N-1}$, $DN_{N-2}$ express the nominal duration of intervals N−1 and N−2 respectively.

It is clear that memory 55 may transcode the information set received as an input into a 4-bit code and without any information loss. In fact, if the nominal duration of interval $DN_{N-1}$ is 4 microseconds, the two most significant bits of code SR1÷5 must be necessarily 0. If the nominal duration is 8 microseconds, the most significant bit must be necessarily 1, and if the nominal duration is 6 microseconds, the most significant bit must be necessarily 0. In fact, the actual duration of interval N−1, corrected as to speed, cannot be different from the nominal duration by more than a preestablished amount which may be theoretically defined and experimentally measured.

In other words, for a given nominal duration, the variability range of the actual duration of interval N−1, expressed by code SR1÷6 is much less than the full duration range which may be expressed by a 6-bit code SR1÷6. Therefore, it suffices that memory 55 produces as an output, a 4-bit code. Such code is provided as an input to memory 79 which transcodes it into the peak-shift of pulse n−1, as a function of the input information $DE_{N-1}$, $DN_{N-1}$ and $DN_{N-2}$. Clearly, the code output from memory 79 may express the peak-shift $PS_{n-1}$ as one constant which may be chosen at will. Further, and this is more important, peak-shift $PS_{n-1}$ computed by memory 79 may be suitably adjusted. In fact, it is clear that being the nominal duration $DN_{N-1}$ now, missing any uncertainty factor due to the $DE_{N-1}$ measurement uncertainty, second order effects on peak-shift, changes in the recording current amplitude or waveform, and so on, the peak-shift $PS_{N-1}$ may take only three theoretical well defined values which depends only on the unknown nominal duration of the subsequent interval $DN_N$.

If the computation of $PS_{n-1}$ is performed by memory 79 with the already indicated logical criteria, that is, by difference ($PS_{n-1}=DE_{N-1}-DN_{N-1}+PS_{n-2}$), leads to the definition of a $PS_{n-1}$ which departs too much from the possible theoretical values, memory 79 can adjust such computed value and produce as an output, a code having a value closer to a theoretical value. In other words, noise effects can be attenuated. In this way, unit 79 provides as an input to adder 57, peak-shift information which is more likely the true one and the discrimination of the nominal duration $DN_N$ by discriminator 58 is made easier. These results are clearly obtained with a ROM having a capacity no greater than 256 words, hence, it is easily integrated into a single chip. In addition, if the actual duration code consists of only five bits, the required memory capacity may be reduced to 128 words.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A digital data separator for use with apparatus for recovering binary information recorded on a movable media applied to an input channel, such separator comprising a measurement unit of an actual duration of an interval N between two subsequent read pulses n+1 and n, a measurement unit of the media speed error, a speed error recovery unit for converting said actual interval duration into a duration corrected as to speed error and expressed by a binary code and a peak-shift recovery unit for receiving said binary code and discriminating components of peak-shift which affect the duration expressed by said code from a nominal duration which is attributed to said interval N, said peak-shift recovery unit comprising:

first register means coupled to said input channel to receive and store a first binary code related to an interval $N-1$ and a preceding interval N;

second register means for storing a second binary code representing a nominal duration $DN_{N-1}$ of said interval $N-1$;

third register means coupled in cascade with said second register means, said third register means for storing a third code representing a nominal duration $DN_{N-2}$ of an interval $N-2$, preceding said $N-1$ interval;

circuit means having a plurality of inputs connected to said first, second and third register means for receiving at the same time, said first, second and third codes, said circuit means providing a fourth binary code representing said peak-shift of said read pulse $n-1$;

arithmetic means having a number of first inputs coupled to said channel for receiving a fifth code related to interval N, a number of second inputs connected to said circuit means for receiving said fourth code, said arithmetic means providing a sixth binary code representing the nominal duration of said interval N, corrected as to speed error and said peak-shift of read pulse $n-1$; and, discriminating means coupled to said arithmetic means for receiving said sixth code and for producing a seventh code representing the nominal duration $DN_N$ of said N interval, said discriminating means being connected to apply said sixth code to said second register means.

2. The digital data separator of claim 1 wherein said circuit means comprises:

a transcoding memory having a number of inputs for receiving said first and second codes, said transcoding memory providing an eighth code representative of the difference between said nominal duration $DN_{N-1}$ of interval $N-1$ and said peak-shift of read pulse $n-2$, and arithmetic means having first and second inputs for receiving said first code and said eighth code respectively, said arithmetic means providing said fourth code representing said peak-shift of read pulse $n-1$.

3. The digital data separator of claim 1 wherein said circuit means comprises:

first transcoding means having a number of inputs for receiving said second code, said third code and at least, the most significant bit of said first code, said first transcoding means transcoding said codes into a compressed code having lesser number of bits; and, second transcoding means having a number of inputs for receiving the bits of said first code, except said most significant bit, and said compressed code, said second transcoding means providing said fourth code, representing said peak-shift of read pulse $n-1$.

* * * * *